United States Patent [19]

Ito

[11] Patent Number: 5,229,572
[45] Date of Patent: Jul. 20, 1993

[54] LASER PROCESSING APPARATUS HAVING PLURAL PROCESSING NOZZLES

[75] Inventor: Susumu Ito, Nagoya, Japan

[73] Assignee: Brother Kogyo Kabushiki Kaisha, Nagoya, Japan

[21] Appl. No.: 864,351

[22] Filed: Apr. 6, 1992

[30] Foreign Application Priority Data

Apr. 24, 1991 [JP] Japan .................................. 3-094073

[51] Int. Cl.⁵ .............................................. B23K 26/14
[52] U.S. Cl. ........................... 219/121.67; 219/121.77; 219/121.84
[58] Field of Search ...................... 219/121.67, 121.72, 219/121.63, 121.64, 121.77, 121.78, 121.74, 121.75, 121.84

[56] References Cited

U.S. PATENT DOCUMENTS

| | | | |
|---|---|---|---|
| 3,986,767 | 10/1976 | Rexer et al. | 219/121.67 X |
| 4,847,462 | 7/1989 | Soodak et al. | 219/121.63 |
| 4,859,826 | 8/1989 | Hess | 219/121.63 |
| 4,967,053 | 10/1990 | Aharon | 219/121.78 |
| 5,006,684 | 4/1991 | Handke et al. | 219/121.6 |
| 5,068,513 | 11/1991 | Gangemi | 219/121.67 |

Primary Examiner—C. L. Albritton
Attorney, Agent, or Firm—Oliff & Berridge

[57] ABSTRACT

The present invention relates to a laser processing apparatus. This laser processing apparatus has plural processing nozzles such as a cutting nozzle and a welding nozzle which are held by a processing nozzle holder. The processing nozzle holder can be rotated with respect to a processing head with a condenser lens disposed therein. Therefore, substitution can be performed easily to a processing nozzle best suited for a desired thermal processing out of various thermal processings, and efficient processings can be executed.

14 Claims, 8 Drawing Sheets

LASER PROCESSING APPARATUS HAVING PLURAL PROCESSING NOZZLES

BACKGROUND OF THE INVENTION

1. Field of the Invention

The present invention relates to a laser processing apparatus which performs processing by radiating a laser beam from a laser beam generator to the surface of a workpiece. More particularly, the present invention relates to a laser processing apparatus capable of performing different kinds of processings under different conditions in an optimum and efficient manner using only a single processing apparatus.

2. Description of the Related Art

Heretofore, laser processing apparatuses of this type have performed thermal processings such as cutting and welding by radiating a laser beam to the surface of a workpiece. As an example, reference is made hereby to the apparatus shown in FIG. 6. First, the construction of this conventional laser processing apparatus will be described below.

Figure 6:
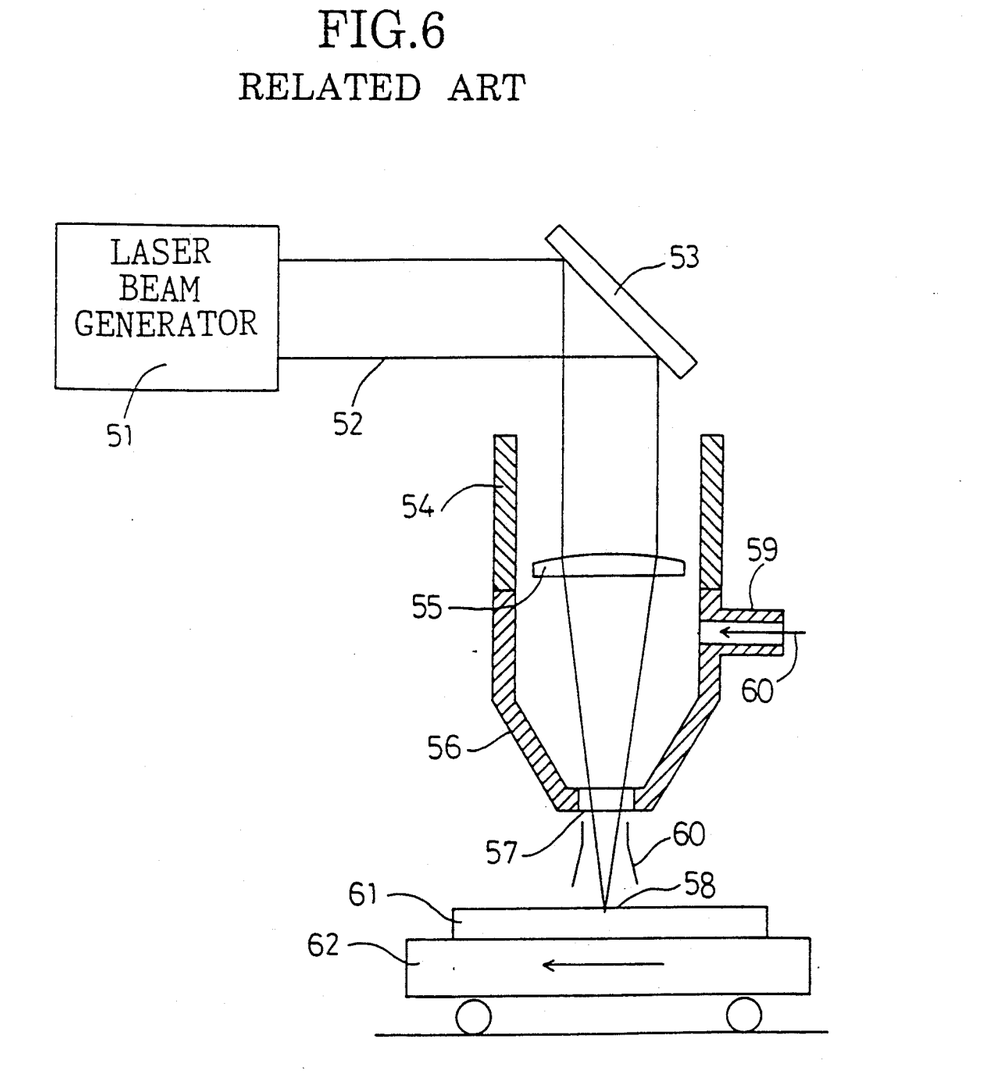
FIG. 6 is a schematic construction diagram of a conventional laser processing apparatus.

This conventional laser processing apparatus generally comprises a laser beam generator 51, a reflecting mirror 53, a processing head 54, a condenser lens 55 and a processing nozzle 56.

The laser beam generator 51 emits a laser beam 52 of 10.6 μm (micrometer) wavelength, the construction of the laser beam generator 51 being generally known well, so the details thereof will be omitted here.

The reflecting mirror 53 changes the travelling direction of the laser beam 52 emitted from the laser beam generator 51. In general, the reflecting mirror 53 is made of copper, and the surface thereof is plated with gold.

The processing head 54 has a generally cylindrical, hollow shape and is constituted by a metal such as aluminum or iron.

The condenser lens 55, having a focal length F, is fixedly disposed in the interior of the processing head 54, and the laser beam 52 reflected by the reflecting mirror 53 is incident on the condenser lens 55. The laser beam 52 thus incident on the condenser lens 55 passes through the condenser lens while being converged by the same lens, and a focal point 58 is formed at a focal length F below the condenser lens 55. In the position of the focal point 58, there is disposed a workpiece 61 which will be described later. The condenser lens 55 is constituted of, for example, zinc selenide (ZnSe), potassium chloride (KCl), or gallium-arsenic (GaAs).

The processing nozzle 56, made of copper, is removably mounted to a front end portion of the processing head 54. The nozzle 56 has a generally conical shape and the interior thereof is tapered and hollow. An ejection opening 57 is provided at a tip end of the nozzle. The laser beam 52 which has been converged by the condenser lens 55 passes through the ejection opening 57 and forms the focal point 58 on the workpiece 61. A processing gas supply port 59 is provided in a part of a side face of the nozzle 56. Processing gas 60 fed through the processing gas supply port 59 is jetted from the ejection opening 57 of the nozzle 56.

The operation of the conventional laser processing apparatus having the above construction will be described below.

The travelling direction of the laser beam 52 emitted from the laser beam generator 51 is changed by the reflecting mirror 53. The laser beam 52 is then incident on the condenser lens 55 in the processing head 54. The laser beam 52 is converged by the condenser lens 55, passes through the ejection opening 57 of the nozzle 56, and is then jetted to the exterior of the nozzle. The laser beam 52 from the processing nozzle 56 forms the focal point 58 at a focal length F under the condenser lens 55. The processing gas 60 fed from the processing gas supply port 59 is also jetted from the ejection opening 57 of the nozzle 56.

The workpiece 61 is disposed in the position of the focal point 58 or thereabouts such that the workpiece 61 is fixed to a moving device 62. The moving device 62 is moved while the laser beam 52 is radiated onto the workpiece 61, whereby a spot of the laser beam formed on the workpiece 61 moves in a relative manner. In this way, a predetermined thermal processing is applied to the workpiece 61 using the laser beam 52.

Figure 7:
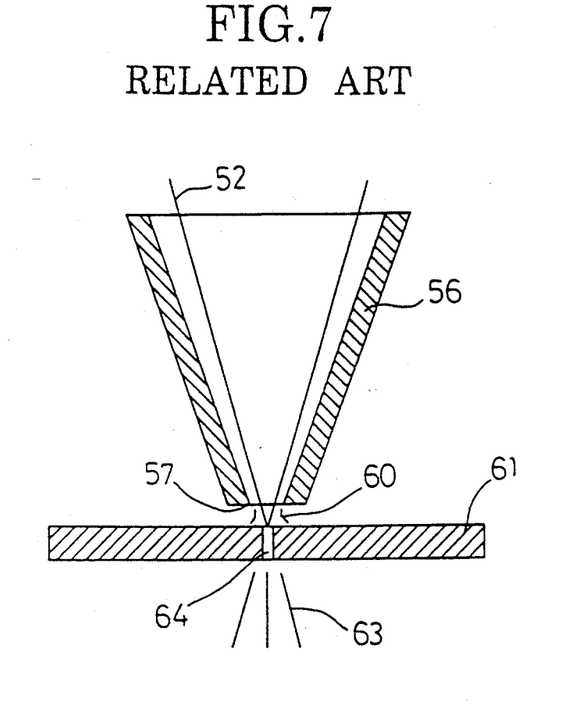
FIG. 7 is an enlarged sectional view of a processing nozzle used in cutting work.

As examples of such thermal processing, cutting and welding work will be explained below. FIG. 7 is a partially enlarged sectional view of the processing nozzle 56 in cutting work, and FIG. 8 is a partially enlarged sectional view of the processing nozzle 56 in welding work.

In cutting work, as shown in FIG. 7, the laser beam 52 is radiated to the workpiece 61, and at the same time the processing gas 60 which is active gas, e.g., oxygen gas, is forcefully directed to the workpiece 61 through the ejection opening 57. As a result, the portion of the workpiece 61 melted as molten metal 63 by the laser beam 52 is blown off by the strong stream of the processing gas 60, to form a cut slot 64 in the workpiece 61. In this case, in order to strengthen the stream of the processing gas 60, the ejection opening 57 formed at the nose of the processing nozzle is relatively small, and the distance between the ejection opening 57 and the workpiece 61 is relatively short.

Figure 8:
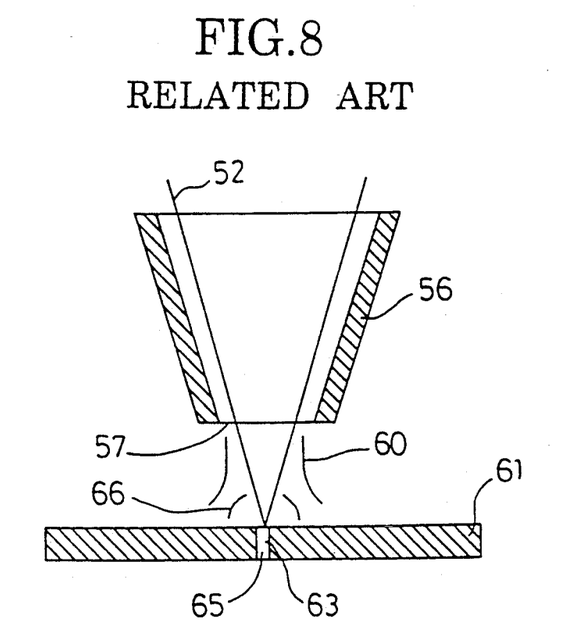
FIG. 8 is an enlarged sectional view of a processing nozzle used in welding work.

On the other hand, in welding work, as shown in FIG. 8, the laser beam 52 is radiated to the workpiece 61, and at the same time the processing gas 60 which is inert gas, e.g., argon gas, is weakly applied to the workpiece 61 through the ejection opening 57. As a result, the portion of the workpiece 61 melted as molten metal 63 by the laser beam 52 is covered with a weak stream of the processing gas 60, and again solidifies while the oxidation thereof is prevented. In this way, a welded portion 65 is formed in the workpiece 61. In this welding work, even if the processing nozzle 56 used in the foregoing cutting work is used as it is, it is possible to change the kind and flow rate of processing gas 60, but the nose portion of the nozzle 56 may be melted by a high-temperature plasma 66 generated in the welded portion. Therefore, in the case of the processing nozzle 56 used for welding work, it is desirable that the distance between the ejection opening 57 and the workpiece 61 be longer than that in the cutting work. In the case of a longer distance between the ejection opening 57 and the workpiece 61, the diameter of the laser beam 52 jetted from the ejection opening 57 also becomes larger. For this reason, the diameter of the ejection opening 57 of the processing nozzle 56 for welding work is set larger than that of the ejection opening 57 of the processing nozzle 56 for cutting work.

Thus, it is desirable to use a processing nozzle 56 having a shape in accordance with the kind of a thermal processing to be performed. Also, in the case where processings of the same type are to be performed, it is desirable to select optimum nozzle shapes according to processing conditions adopted.

In the case of performing different types of thermal processings in such a conventional laser processing apparatus as described above, it is necessary to change processing nozzles from one to another appropriately according to the type of the thermal processing to be done. In the conventional laser processing apparatus, this nozzle changing operation is conducted manually, thus causing the problem of deterioration of production efficiency.

Figure 9:
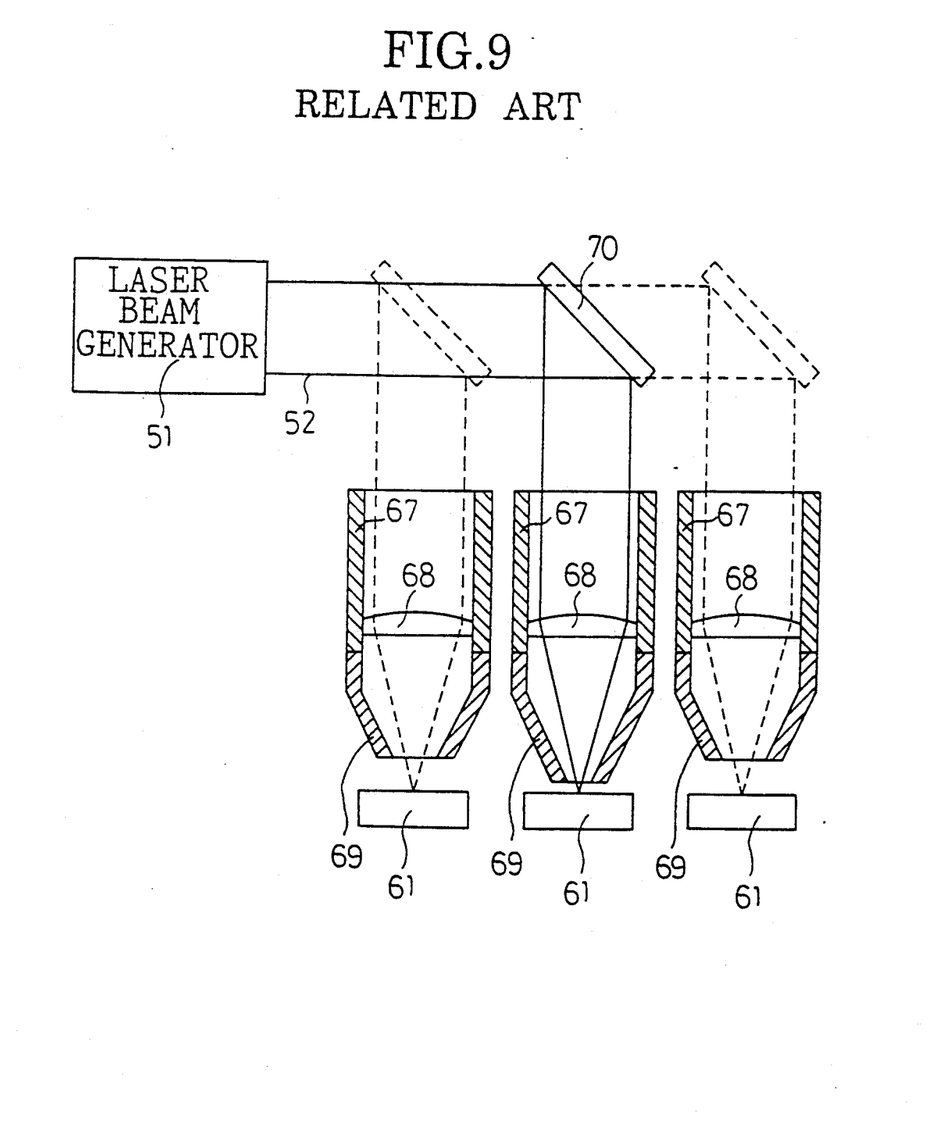
FIG. 9 is a schematic construction diagram of another conventional laser processing apparatus.

As another conventional example, as shown in FIG. 9, a laser processing apparatus has been proposed which is provided with each of plurality of processing heads 67, condenser lenses 68 and processing nozzles 69 (three in this conventional example) according to processings required. According to the construction of this conventional laser processing equipment, the laser beam 52 from the laser beam generator 51 is conducted to the required processing nozzle 69 by changing the position of a reflecting mirror 70 to the position corresponding to the required processing nozzle 69. With this construction, the deterioration of production efficiency is avoidable because it is not necessary to perform the removal and replacement of the processing nozzle 69 with respect to the processing head. However, since it is necessary to provide the same number of condenser lenses 68, which are expensive, as the number of the processing nozzles 69 used. Accordingly, an increase in cost results, and since the number of the processing heads 67 must also be the same as the number of the processing nozzles 69, the size of the entire laser processing apparatus also becomes very large.

SUMMARY OF THE INVENTION

An object of the present invention to provide a laser processing apparatus which is high in production efficiency, inexpensive, and capable of attaining a desirable reduction of size.

According to the present invention, in order to achieve the above-mentioned object, there is provided a laser processing apparatus for processing a workpiece by radiating a laser beam from a laser beam generator to a surface of the workpiece, the laser processing apparatus including a generally cylindrical, hollow processing head having an opening for incidence thereon of the laser beam from the laser beam generator; optical means disposed in the interior of the processing head and/or a part of the peripheral surface thereof to converge the laser beam incident on the optical means from the laser beam generator; processing nozzle holder means which substantially covers the processing head and which is disposed rotatably in the circumferential direction of the processing head; and at least two processing nozzles each having in a nose portion thereof an ejection opening for ejecting the laser beam which has been converged by the optical means.

According to the laser processing apparatus of the above construction, the laser beam from the laser beam generator is converged by the optical means in the processing head, and then, is conducted to one of the plural processing nozzles held by the processing nozzle holder means, whereby a thermal processing according to the beam-conducted processing nozzle can be applied to the workpiece.

BRIEF DESCRIPTION OF THE DRAWINGS

Preferred embodiments of the present invention will be described in detail below with reference to the accompanying drawings, wherein.

DETAILED DESCRIPTION OF THE PREFERRED EMBODIMENTS

Embodiments of the present invention will be described hereinunder with reference to the drawings.

Figure 1:
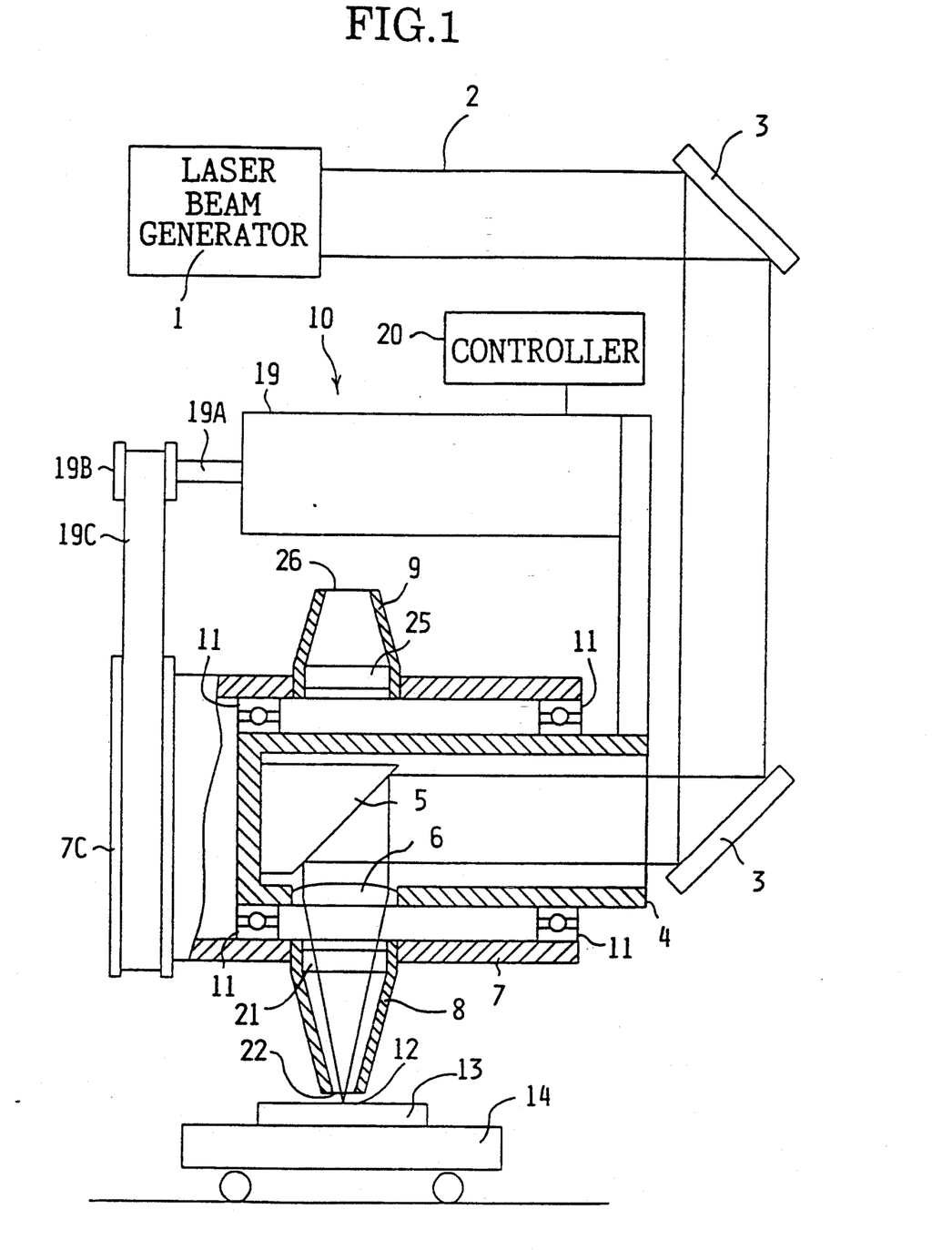
FIG. 1 is a schematic construction diagram of a laser processing apparatus in a preferred embodiment according to the present invention.
Figure 2:
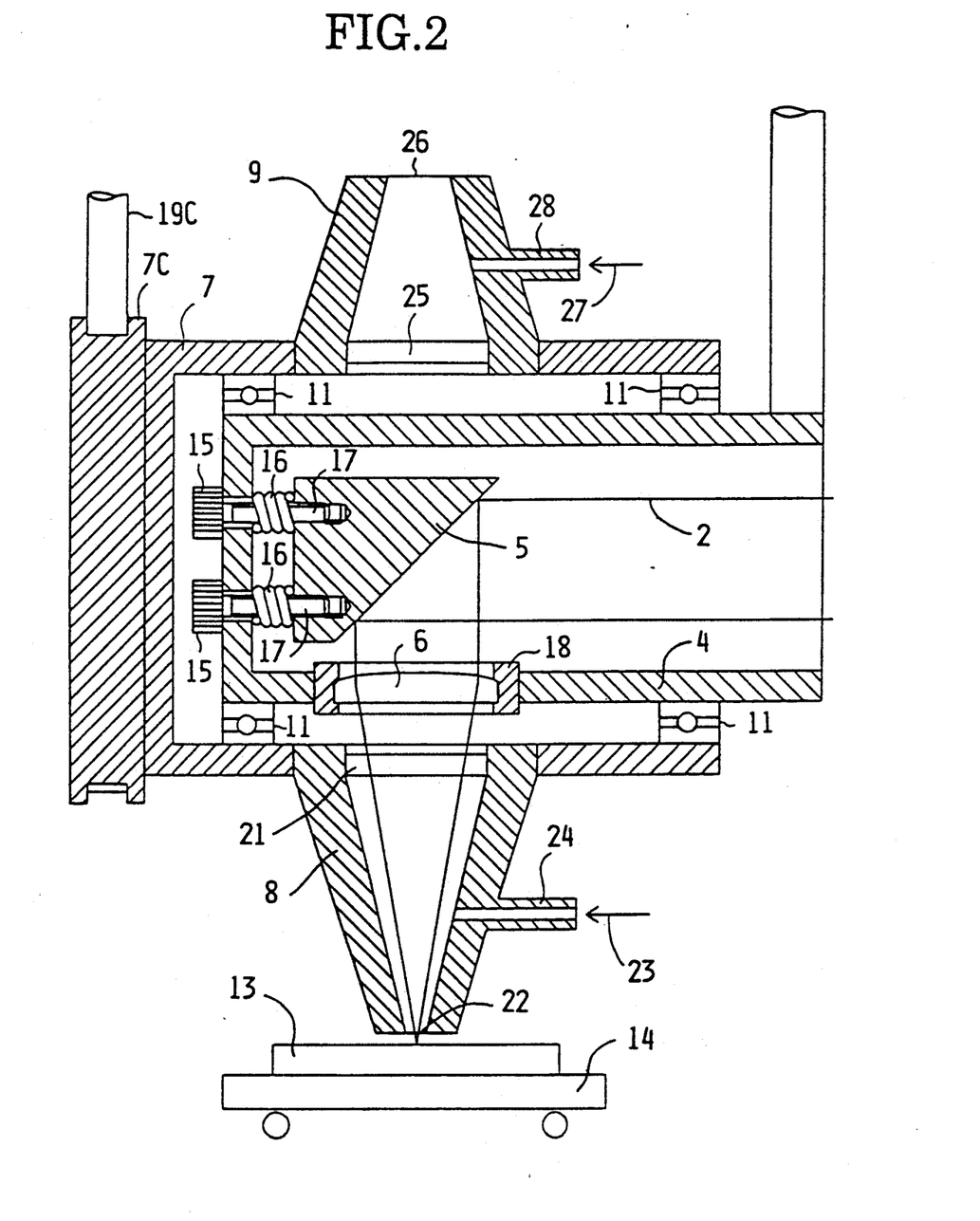
FIG. 2 is an enlarged construction diagram of a processing head and the vicinity thereof.

Referring first to FIGS. 1 and 2, the construction of a laser processing apparatus embodying the invention will be described. FIG. 1 is a schematic construction diagram of the laser processing apparatus, and FIG. 2 is an enlarged construction diagram of a processing head and the vicinity thereof.

The laser processing apparatus of this embodiment generally comprises a $CO_2$ laser beam generator 1, plane reflective mirrors 3, a processing head 4, a reflecting mirror 5, a condenser lens 6, a processing nozzle holder 7, a processing nozzle 8 for cutting, a processing nozzle 9 for welding, and a processing nozzle holder driving unit 10.

The $CO_2$ laser beam generator 1 emits a laser beam 2 having a wavelength of 10.6 $\mu$m. Since its construction is generally known well, the details thereof will not be described here.

The plane reflective mirrors 3 are fixedly disposed on an optical path of the laser beam 2 emitted from the $CO_2$ laser beam generator 1, plane reflective mirrors 3 changing the travelling path of the laser beam. The plane reflective mirrors 3 are made of copper, and their reflective surfaces are plated with gold. In this embodiment, two plane reflective mirrors 3 are used.

The processing head 4 comprises a metal such as aluminum and iron, and it has a generally cylindrical, hollow shape. One end of the processing head 4 is an open end, through which the laser beam 2 having a travelling direction changed by the plane reflective mirrors 3 is incident on the interior of the processing head 4. In a part of the side face of the processing head 4, there is provided a condenser lens holder 18 to fix the condenser lens 6 which will be described later.

The reflecting mirror 5 is disposed in the other end portion of the processing head 4. This reflecting mirror 5 is also made of copper, and its reflective surface is plated with gold. The laser beam 2 incident on the interior of the processing head 4 is applied to the reflective surface of the reflecting mirror 5 at an incidence angle of 45° and is reflected thereby. Therefore, the laser beam 2 is reflected in the direction of approximately 90° with respect to its incident direction into the processing head 4. As shown in FIG. 2, the reflecting mirror 5 is fixed to the other end portion of the processing head 4 through angle adjusting mechanisms 15, each composed of a compression coil spring 16 and a screw member 17. By rotating the screw member 17, it is possible to adjust the angle of the reflecting mirror 5, whereby the travelling direction of the laser beam 2 can be finely adjusted. The laser beam 2 reflected by the reflecting mirror 5 is then incident on the condenser lens 6 held by a condenser lens holder 18.

The condenser lens 6, having a focal length F, is held by the condenser lens holder 18 which is provided in a part of the side face of the processing head 4, as mentioned above. The condenser lens 6 is disposed in an intersection between the optical path of the laser beam 2 reflected by the reflecting mirror 5 and the side face of the processing head 4. Further, the condenser lens 6 comprises, for example, zinc selenide (ZnSe), potassium chloride (KCl), or gallium-arsenic (GaAs).

The processing nozzle holder 7 is formed of a metal such as aluminum or iron, and it has a generally cylindrical, hollow shape larger in diameter than the processing head 4. One end of the holder 7 is an open end, through which the processing head 4 is inserted into the holder. To the other end portion of the holder 7 is fixed a pulley portion 7C across which a timing belt 19C, described later, is stretched. The processing nozzle holder 7 is disposed around the processing head 4 through ball bearings 11 of the processing nozzle holder driving unit 10 which will be described later. The processing head 4 and the processing nozzle holder 7 are concentric with each other, and the holder 7 can be rotated by the driving unit 10 with respect to the processing head 4. On the peripheral surface of the processing nozzle holder 7, there are provided two processing nozzles in a symmetric fashion with respect to the axis of the holder 7, one of which is the processing nozzle 8 for cutting and the other of which is the processing nozzle 9 for welding.

Figure 4:
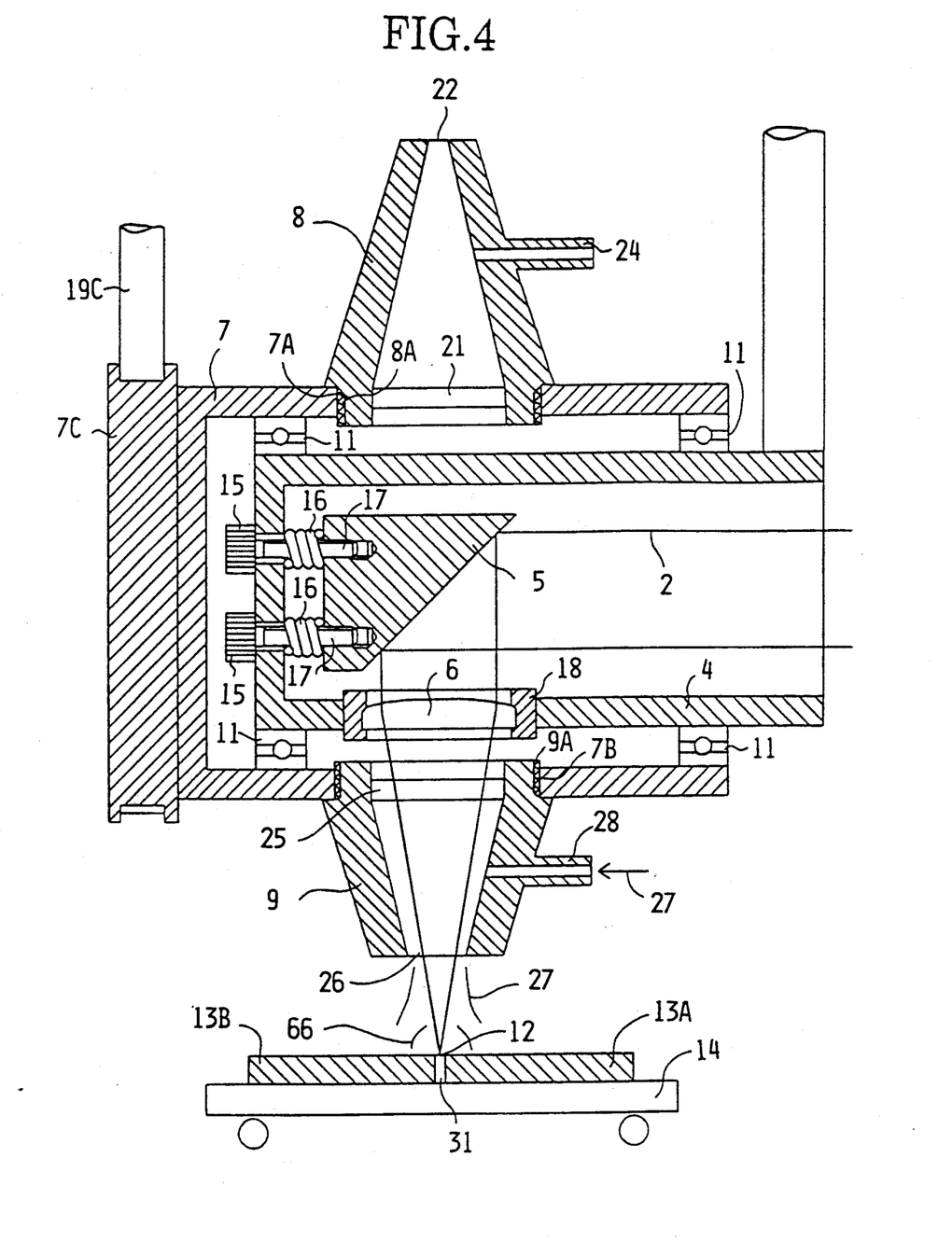
FIG. 4 is a view showing the state of welding work using the laser processing apparatus in this embodiment.

The cutting nozzle 8 is made of copper and has a substantially conical shape. The interior of the nozzle 8 is tapered and hollow. As shown in FIG. 4, the cutting nozzle 8 has a threaded portion 8A, which is in engagement with a threaded portion 7A of the processing nozzle holder 7 so that the cutting nozzle 8 can be attached to and detached from the holder 7. A transmission window 21 for the laser beam 2 is disposed in an opening portion of the cutting nozzle 8, on which the laser beam is incident after passing through the condenser lens 6. Like the condenser lens 6, the transmission window 21 also comprises, for example, zinc selenide (ZnSe), potassium chloride (KCl), or gallium-arsenic (GaAs). Another opening formed in a nose portion of the cutting nozzle 8 is an ejection opening 22 for the laser beam 2, having a diameter of 1 mm (millimeter). The distance from the condenser lens 6 to the ejection opening 22 is (F-1) mm, whereby a focal point 12 of the laser beam 2 is formed in a position 1 mm below the ejection opening 22. Further, in the side face of the cutting nozzle 8, there is provided a supply port 24 for assist gas 23 in a position between the transmission window 21 and the ejection opening 22. For cutting work, the assist gas 23 which is active gas, e.g., oxygen gas, is fed into the nozzle 8 through the supply port 24, and then, jetted from the ejection opening 22. By the provision of the transmission window 21, the assist gas 23 is jetted from only the ejection opening 22.

The welding nozzle 9 is also formed of copper and has an almost conical shape. The interior of the nozzle 9 is tapered and hollow. As shown in FIG. 4, the welding nozzle 9 has a threaded portion 9A, which is in engagement with the threaded portion 7B of the processing nozzle holder 7. Thus, the welding nozzle 9 can be attached to and detached from the holder 7. A transmission window 25 for the laser beam 2 is disposed in an opening portion of the welding nozzle 9, on which the laser beam is incident after passing through the condenser lens 6. Like the condenser lens 6, the transmission window 25 comprises, for example, zinc selenide (ZnSe), potassium chloride (KCl), or gallium-arsenic (GaAs). Another opening formed in a nose portion of the welding nozzle 9 is an ejection opening 26 for the laser beam 2, having a diameter of 6 mm. The distance from the condenser lens 6 to the ejection opening 26 is (F-10) mm, whereby the focal point 12 of the laser beam 2 is formed in a position 10 mm below the ejection opening 26. Further, in the side face of the welding nozzle 9, there is provided a supply port 28 for assist gas 27 in a position between the transmission window 25 and the ejection opening 26. For welding work, the assist gas 27 which is an inert gas, e.g., argon gas, is fed into the welding nozzle 9 through the supply port 28.

The processing nozzle holder driving unit 10 comprises plural ball bearings 11, a stepping motor 19, a motor shaft 19A, a pulley 19B, the timing belt 19C and a controller 20.

The rotational position of the stepping motor 19 is controlled by the controller 20, and hence, a rotational position, i.e., angle of rotation, of the motor shaft 19A is controlled by the controller 20. The pulley 19B is fixed onto the motor shaft 19A. The timing belt 19C is positioned between the pulley 19B and the pulley portion 7C of the processing nozzle holder 7. The motor shaft 19A of the stepping motor 19 is rotated by the controller 20. It is thus possible to control the position of the processing nozzle holder 7 relative to the processing head 4. More specifically, in cutting work, the nozzle holder 7 rotates and stops with respect to the processing head 4 in such a manner that the transmission window 21 of the cutting nozzle 8 is opposed to the condenser lens 6 of the processing head 4. Likewise, in welding work, the nozzle holder 7 rotates and stops with respect to the processing head 4 so that the transmission window 25 of the welding nozzle 9 is opposed to the condenser lens 6 of the processing head 4. The laser beam 2 is converged after incidence on the condenser lens 6 and is then conducted to either the cutting nozzle 8 or the welding nozzle 9, both attached to the processing nozzle holder 7. The laser beam 2 is then jetted from either the ejection opening 22 of the cutting nozzle 8 or the ejection opening 26 of the welding nozzle 9. Under the ejection opening 22 or 26, there is formed the focal point 12 at a distance F from the condenser lens 6.

A workpiece 13 is fixed onto a moving device 14, and is disposed at the focal point 12 or thereabouts. The moving device 14 is moved while the laser beam 2 is radiated to the workpiece 13, thereby causing a relative movement of a spot of the laser beam 2 formed on the workpiece 13. In this way, a thermal processing such as cutting or welding is performed.

Figure 3:
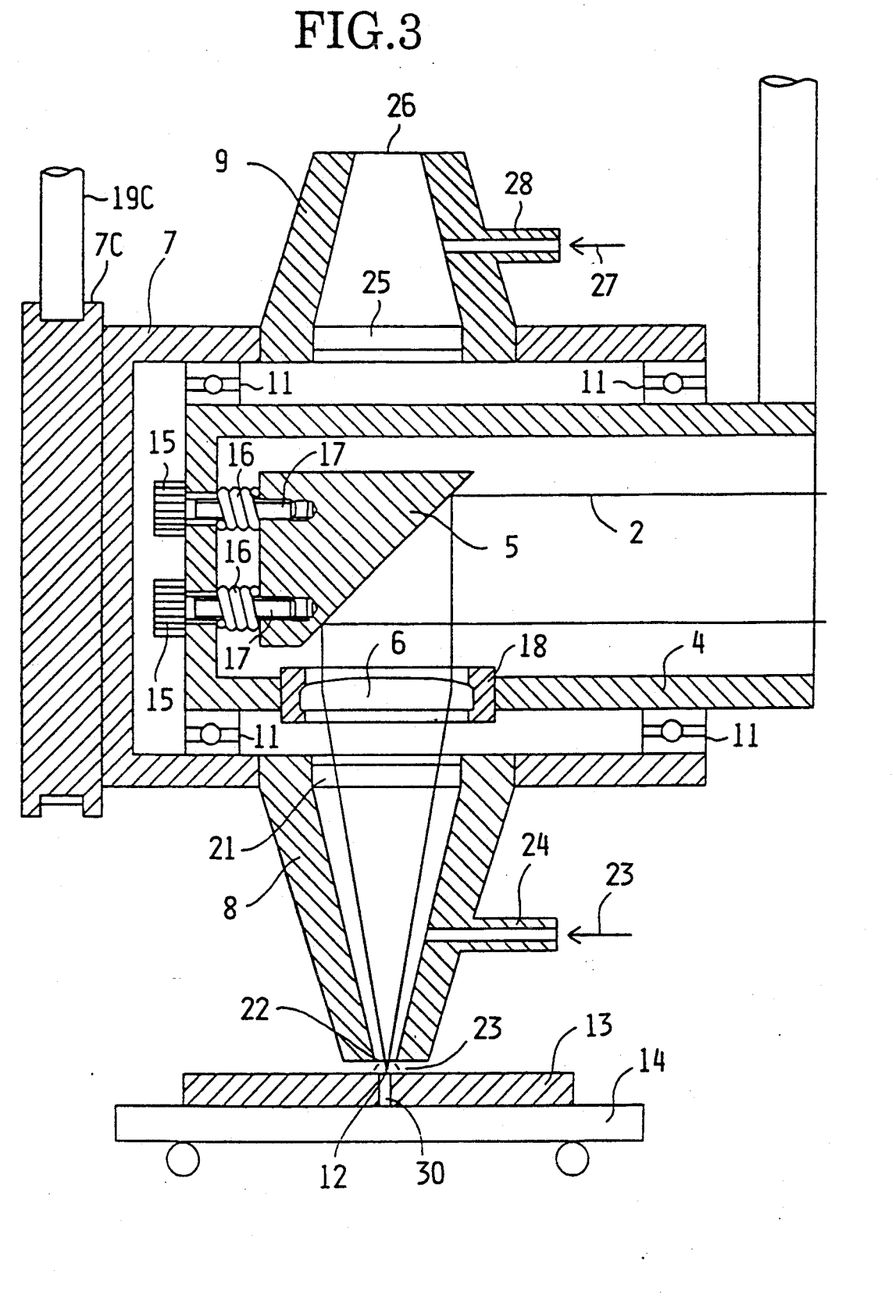
FIG. 3 is a view showing the state of cutting work using the laser processing apparatus in this embodiment.

The following is a description of cutting work using the laser processing equipment in this embodiment with reference to FIG. 3.

In cutting work, the processing nozzle holder 7 is driven so that the laser beam 2 passes through the axis of the cutting nozzle 8 held by the nozzle holder 7. The nozzle holder 7 is driven while the nozzle holder driving unit 10 is controlled by the controller 20. A deviation between the optical axis of the laser beam 2 and the axis of the cutting nozzle 8 can be corrected by making a fine adjustment beforehand using the angle adjusting mechanisms 15 for the reflecting mirror 5.

As the assist gas 23, an active gas such as oxygen gas is fed through the supply port 24 of the cutting nozzle 8 and jetted from the ejection port 22.

The workpiece 13 disposed in the position of the focal point 12 of the laser beam 12 is fixed to the moving device 14. The metal of the workpiece is melted in the portion thereof radiated with the laser beam 2 and the thus-melted metal portion is blown off by the assist gas 23, whereby a cut slot 30 is formed. The workpiece 13 is moved by the moving device 14, and in this way, predetermined cutting work is completed.

Referring now to FIG. 4, welding work using the laser processing apparatus in this embodiment will be described below.

In welding work, the processing nozzle holder 7 is driven in such a manner that the laser beam 2 passes through the axis of the welding nozzle 9 held by the nozzle holder 7. The nozzle holder 7 is driven while the processing nozzle holder driving unit 10 is controlled by the controller 20. If there is a deviation between the optical axis of the laser beam 2 and the axis of the welding nozzle 9, the deviation can be corrected by making a fine adjustment beforehand using the angle adjusting mechanisms 15 for the reflecting mirror 5.

As the assist gas 27, an inert gas such as argon gas is fed through the supply port 28 of the welding nozzle 9, and is jetted from the ejection opening 26.

Workpieces 13A and 13B disposed in the position of the focal point 12 of the laser beam 2 are fixed to the moving device 14. The workpieces 13A and 13B are melted by the radiation of the laser beam 2 to form a melted portion 31. The melted portion 31 is covered with the assist gas 27 which is weak, and again solidifies while the oxidation thereof is prevented. In this way, the workpieces 13A and 13B are welded together. The workpieces are then moved by the moving device 14, whereby predetermined welding work is completed. Although in this welding work a high-temperature plasma 66 is generated in the melted portion 31, the welding nozzle 9 itself will never be melted because the ejection opening 26 of the nozzle 9 is in a position relatively spaced from the melted portion 31.

According to the laser processing equipment of the present invention, as will be apparent from the above description, although it is a single apparatus, various thermal processings, including cutting and welding, can be done each using an optimum processing nozzle. Consequently, not only the best processing quality can be attained but also troublesome operations such as manual replacement of processing nozzles are no longer required, thus leading to the improvement of production efficiency. These are outstanding effects industrially.

The present invention is not limited to the embodiment described in detail above. Various modifications may be made within the scope not departing from the gist of the invention.

For example, although in the above embodiment two processing nozzles 8 and 9 are held by the processing nozzle holder 7, the number of processing nozzles to be held by the nozzle holder is not limited to two. The kind and number of processing nozzles to be disposed on the nozzle holder 7 may be determined according to processings to be performed. More than two processing nozzles may thus be provided.

Also, with respect to a shape of the nozzle, an optimum one may be selected according to the kind of processings required as well as the kind and shape of the workpiece.

Even in the event of damage of a processing nozzle, since each processing nozzle is detachable from the processing nozzle holder, only the damaged nozzle need be replaced.

Figure 5:
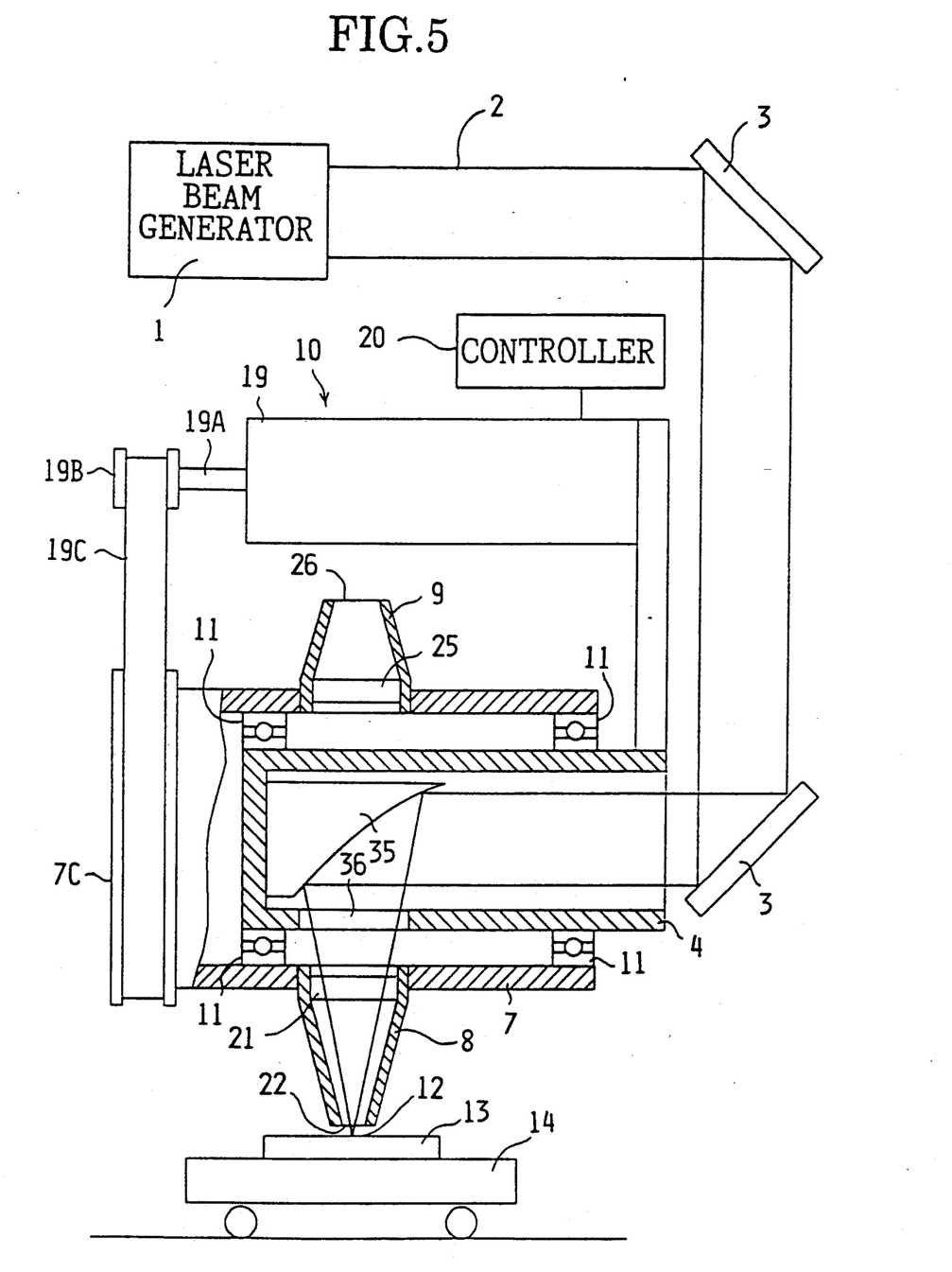
FIG. 5 is a schematic construction diagram of a laser processing apparatus in another preferred embodiment according to the present invention.

As shown in FIG. 5, the reflecting mirror 5 and the condenser lens 6 as optical means may be substituted by another light condensing optical system including a parabolic mirror 35, for example. Also, with respect to characteristic values of optical parts, e.g., a focal length, suitable values may be selected according to the performance of a laser beam generator used, a required processing quality, etc. The laser beam 2 incident on the parabolic mirror 35 is not only reflected but also converged. In this case, in the portion where the condenser lens 6 has been disposed in the previous embodiment, a transmission window 36 may be disposed, or the opening may be left as it is.

Further, although in the previous embodiment the processing nozzle holder is rotated using the stepping motor, the nozzle holder may be rotated manually by the operator.

What is claimed is:

1. A laser processing equipment for processing a workpiece by emitting a laser beam from a laser beam generator to a surface of the workpiece, comprising:
   a hollow processing head having an opening for incidence therethrough of the laser beam emitted from the laser beam generator, said processing head having a substantially cylindrical shape;
   optical means for converging the laser beam emitted from the laser beam generator said optical means being disposed in at least one of an interior of said processing head and a part of a peripheral surface of said processing head;
   processing nozzle holder means for substantially covering said processing head, said processing nozzle holder means being disposed rotatably in a circumferential direction of said processing head; and
   at least two processing nozzles each having a nose portion, each said nose portion having an ejection opening, which ejects the laser beam which has been converged by the optical means, said processing nozzles being mounted to said processing nozzle holder means.

2. The laser processing equipment according to claim 1, wherein said processing nozzle holder means has a substantially cylindrical, hollow shape and is larger in diameter than said processing head and has an opening for inserting said processing head therethrough, said processing nozzle holder means and said processing head being concentric with each other.

3. The laser processing equipment according to claim 1 wherein said processing nozzles are exchangeably mounted to and removed from said processing nozzle holder means.

4. The laser processing equipment according to claim 1, wherein said processing nozzles each have a supply port for supplying assist gas in a side face thereof and have a transmission window for transmitting the laser beam therethrough.

5. The laser processing equipment according to claim 1, wherein sa-id at least two processing nozzles comprise a cutting nozzle and a welding nozzle.

6. The laser processing equipment according to claim 1, wherein said optical means comprises a reflecting mirror disposed in said processing head and a condenser lens provided in a peripheral surface of said processing head.

7. The laser processing equipment according to claim 1, wherein said optical means comprises a parabolic mirror disposed in said processing head.

8. A laser processing equipment for processing a workpiece by emitting a laser beam from a laser beam generator to the surface of the workpiece, comprising:
   a hollow processing head having an opening for incidence therethrough of the laser beam emitted from the laser beam generator, said processing head being substantially cylindrical in shape;
   reflecting means for adjusting a travelling direction of the laser beam emitted from the laser beam generator, said reflecting means being disposed so as to be finely adjustable in said processing head;
   lens means for converging the laser beam emitted from the laser beam generator, said lens means being disposed in a part of a peripheral surface of said processing head;
   processing nozzle holder means for substantially covering said processing head, said processing nozzle holder means being disposed rotatably in the circumferential direction of said processing head;
   at least two processing nozzles each having in a nose portion thereof an ejection opening for ejecting the laser beam which has been converged by the optical means, said processing nozzles being mounted to said processing nozzle holder means;
   driving means for rotating said processing nozzle holder means relatively with respect to said processing head; and
   control means for controlling said driving means to set a rotational position of said processing nozzle holder.

9. The laser processing equipment according to claim 8, wherein said processing nozzle holder means has a substantially cylindrical, hollow shape larger in diameter than said processing head and has an opening for inserting said processing head therethrough, said processing nozzle holder means and said processing head being concentric with each other.

10. The laser processing equipment according to claim 8, wherein said processing nozzles are exchangeably mounted to and removed from said processing nozzle holder means.

11. The laser processing equipment according to claim 8, wherein said processing nozzles each have a supply port for supplying assist gas in a side face of said processing nozzle and has a transmission window for transmitting the laser beam therethrough.

12. The laser processing equipment according to claim 8, wherein said at least two processing nozzles comprise a cutting nozzle and a welding nozzle.

13. The laser processing equipment according to claim 8, wherein said processing nozzle holder means has a first pulley means.

14. The laser processing equipment according to claim 13, wherein said processing nozzle holder driving means comprises:
   a stepping motor having a motor shaft;
   a second pulley means fixed onto the motor shaft; and
   an endless timing belt;
   wherein said timing belt is extended between said first pulley means and said second pulley means.

* * * * *